(12) United States Patent
Choi

(10) Patent No.: US 12,168,489 B2
(45) Date of Patent: Dec. 17, 2024

(54) ELECTRIC VEHICLE PLATFORM AND MODULAR VEHICLE STRUCTURE INCLUDING ELECTRIC VEHICLE PLATFORM

(71) Applicant: DRIVETECH CO., LTD., Bucheon-si (KR)

(72) Inventor: Yun Yong Choi, Gyeonggi-do (KR)

(73) Assignee: DRIVETECH CO., LTD., Gyeonggi-do (KR)

( * ) Notice: Subject to any disclaimer, the term of this patent is extended or adjusted under 35 U.S.C. 154(b) by 655 days.

(21) Appl. No.: 17/533,248

(22) Filed: Nov. 23, 2021

(65) Prior Publication Data

US 2023/0092312 A1  Mar. 23, 2023

(30) Foreign Application Priority Data

Sep. 17, 2021  (KR) .................. 10-2021-0124563

(51) Int. Cl.
*B62D 63/02* (2006.01)
*B60K 1/04* (2019.01)

(52) U.S. Cl.
CPC .............. *B62D 63/025* (2013.01); *B60K 1/04* (2013.01); *B60K 2001/0438* (2013.01)

(58) Field of Classification Search
CPC ................. B62D 63/025; B62D 27/06; B60K 2001/0438; B60K 2001/0416; B60L 50/66

See application file for complete search history.

(56) References Cited

U.S. PATENT DOCUMENTS

| 5,934,397 A * | 8/1999 | Schaper .............. B62D 63/025 180/65.245 |
| 6,059,058 A * | 5/2000 | Dower ................... B60L 50/52 180/65.265 |

(Continued)

FOREIGN PATENT DOCUMENTS

JP        2019-025945 A       2/2019

OTHER PUBLICATIONS

"Electric Brands' modular electric vehicle XBUS," Web page <http://www.dailycar.co.kr/content/news.html?type=view&autold=40153>, 4 pages, Jul. 12, 2021, date retrieved Jul. 5, 2022).

(Continued)

*Primary Examiner* — Jeffrey J Restifo
(74) *Attorney, Agent, or Firm* — Locke Lord LLP; Scott D. Wofsy; Gabrielle L. Gelozin

(57) ABSTRACT

The present invention provides an electric vehicle platform according to an embodiment of the present invention. The electric vehicle platform includes two side frames extending from front wheels to rear wheels of a vehicle, a plurality of support frames connecting the side frames, a driving motor disposed between two front wheels or between two rear wheels, a battery configured to supply power to the driving motor, a controller configured to control the driving motor and the battery, and a cover assembly connected to the side frames and the support frames so as to cover the driving motor, the battery, and the controller. Here, the cover assembly is divided into a first area defined above the front wheels, a second area defined between the front wheels and the rear wheels, a third area covering the battery and the controller, and a fourth area defined above the rear wheels.

20 Claims, 10 Drawing Sheets

(56) References Cited

U.S. PATENT DOCUMENTS

| | | | | |
|---|---|---|---|---|
| 8,910,740 B2* | 12/2014 | Ehl | ............... | B62D 21/02 |
| | | | | 180/311 |
| 8,950,530 B2* | 2/2015 | Niedzwiecki | ............ | B60K 6/46 |
| | | | | 280/33.998 |
| 9,637,190 B2* | 5/2017 | Pojidaev | ................ | E02F 3/96 |
| 10,603,997 B2* | 3/2020 | Bergstrom | ............ | B60K 16/00 |
| 10,668,926 B2* | 6/2020 | Birnschein | ......... | B60R 16/0231 |
| 10,737,737 B2* | 8/2020 | Birnschein | ............ | G07C 5/008 |
| 10,780,930 B1* | 9/2020 | Kentley-Klay | ....... | B62B 3/0612 |
| 11,110,977 B2* | 9/2021 | Smith | ............... | B60K 17/3462 |
| 11,124,076 B1* | 9/2021 | Borghi | ................ | B62D 21/02 |
| 11,307,596 B2* | 4/2022 | Mackin | ............... | H04L 67/125 |
| 11,338,864 B2* | 5/2022 | Carlden | ............. | B62D 27/023 |
| 11,358,445 B1* | 6/2022 | Shahoian | ................ | B60J 5/12 |
| 11,376,750 B2* | 7/2022 | Radetzki | ............. | B25J 19/0029 |
| 11,518,438 B2* | 12/2022 | Nagaya | .................. | B60K 1/00 |
| 11,820,241 B2* | 11/2023 | Borghi | ................. | B60L 50/66 |
| 11,897,563 B2* | 2/2024 | Caynak | .................. | B62D 49/02 |
| 11,987,268 B2* | 5/2024 | Claesson | ........... | B60W 60/0015 |
| 11,989,033 B2* | 5/2024 | Georgeson | ............ | B62D 27/06 |
| 2014/0262583 A1* | 9/2014 | Url | ...................... | B62D 33/023 |
| | | | | 296/183.1 |
| 2021/0023934 A1 | 1/2021 | Gillett | | |
| 2021/0046985 A1* | 2/2021 | Claesson | ................. | B60P 3/42 |
| 2022/0212736 A1* | 7/2022 | Bollinger | ............ | B62D 63/025 |
| 2023/0092312 A1* | 3/2023 | Choi | .................... | B62D 24/00 |
| | | | | 296/193.04 |
| 2024/0199151 A1* | 6/2024 | Subramanian | ....... | B62D 63/025 |

OTHER PUBLICATIONS

Office Action issued in corresponding Korean Patent Application No. 10-2021-0124563, dated Jul. 6, 2022. (6 pages).

\* cited by examiner

[FIG. 1]
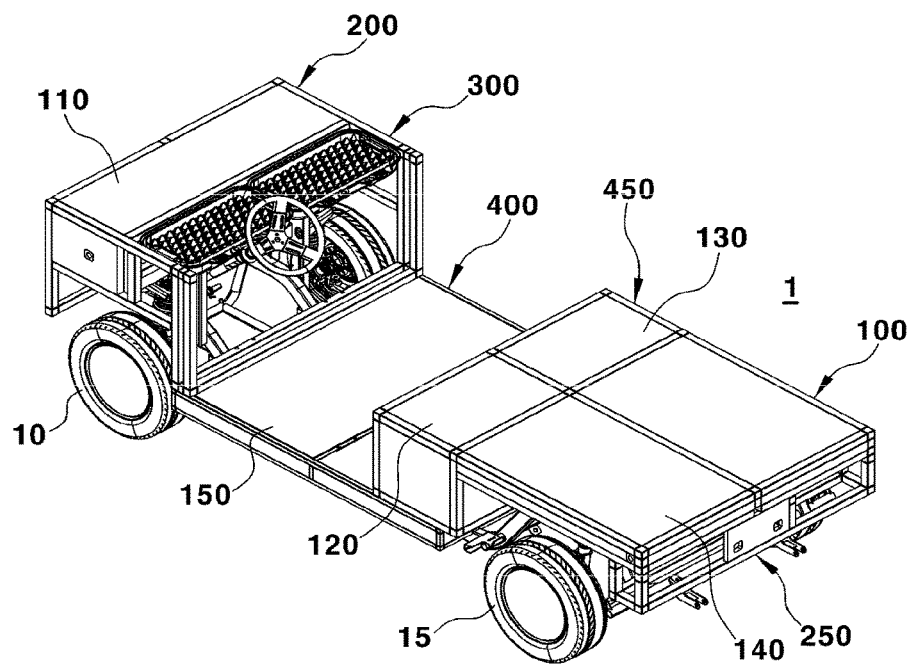

[FIG. 2]
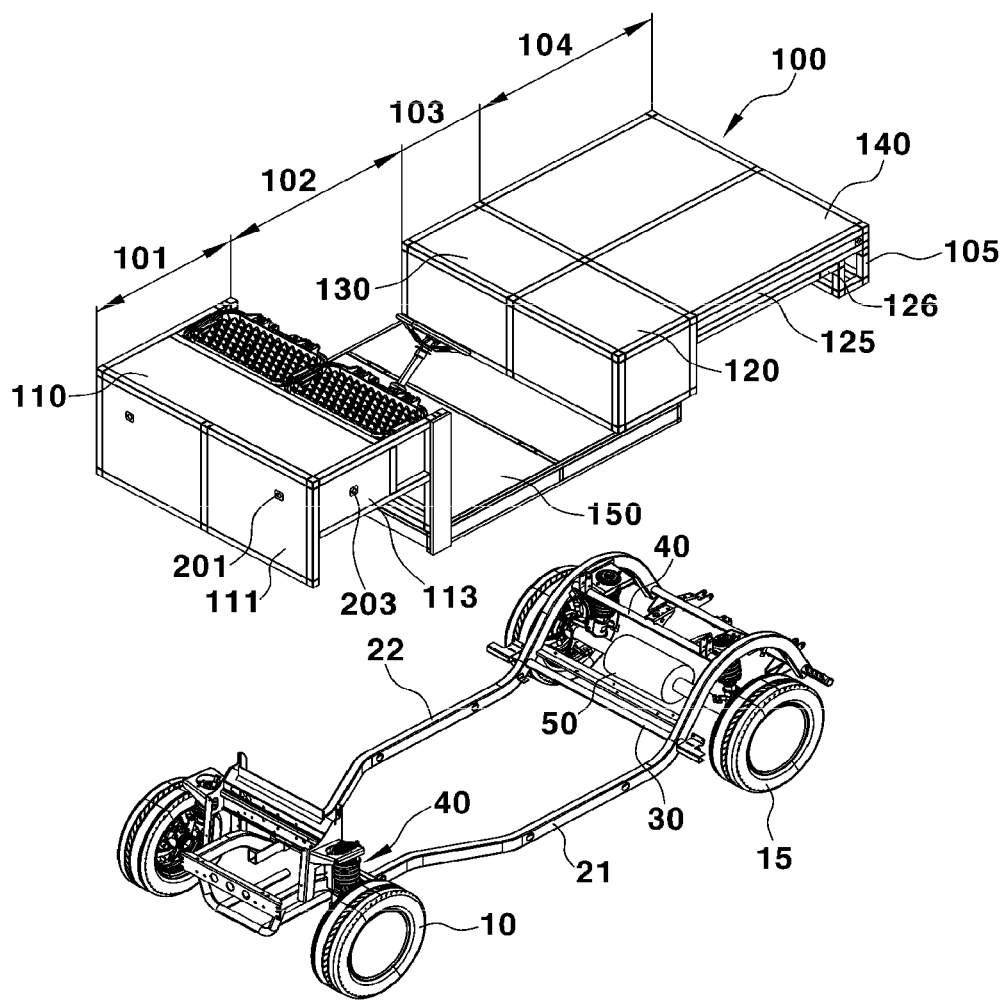

[FIG. 3]
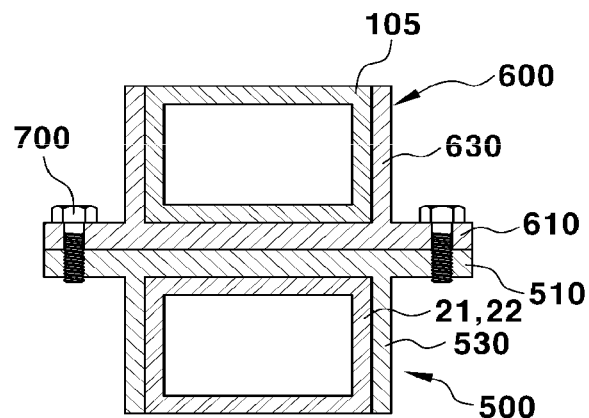
[FIG. 4]
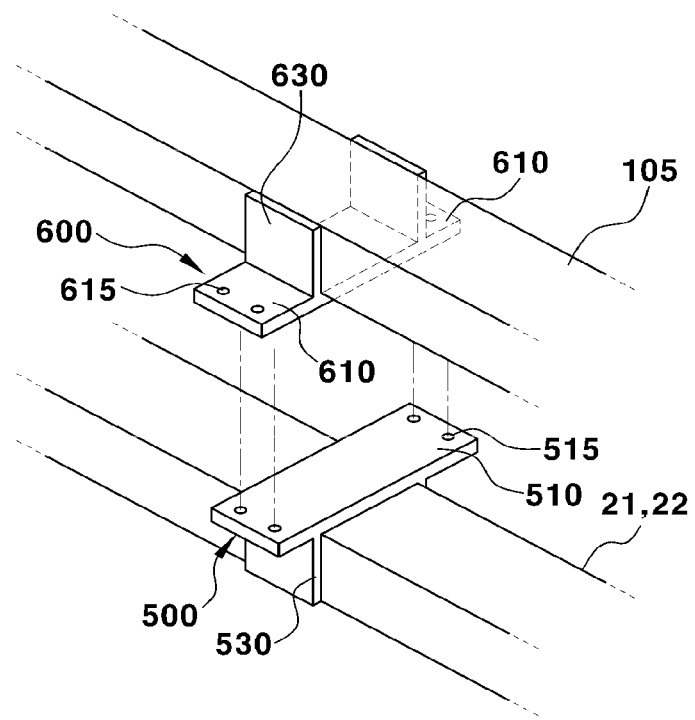

[FIG. 5]
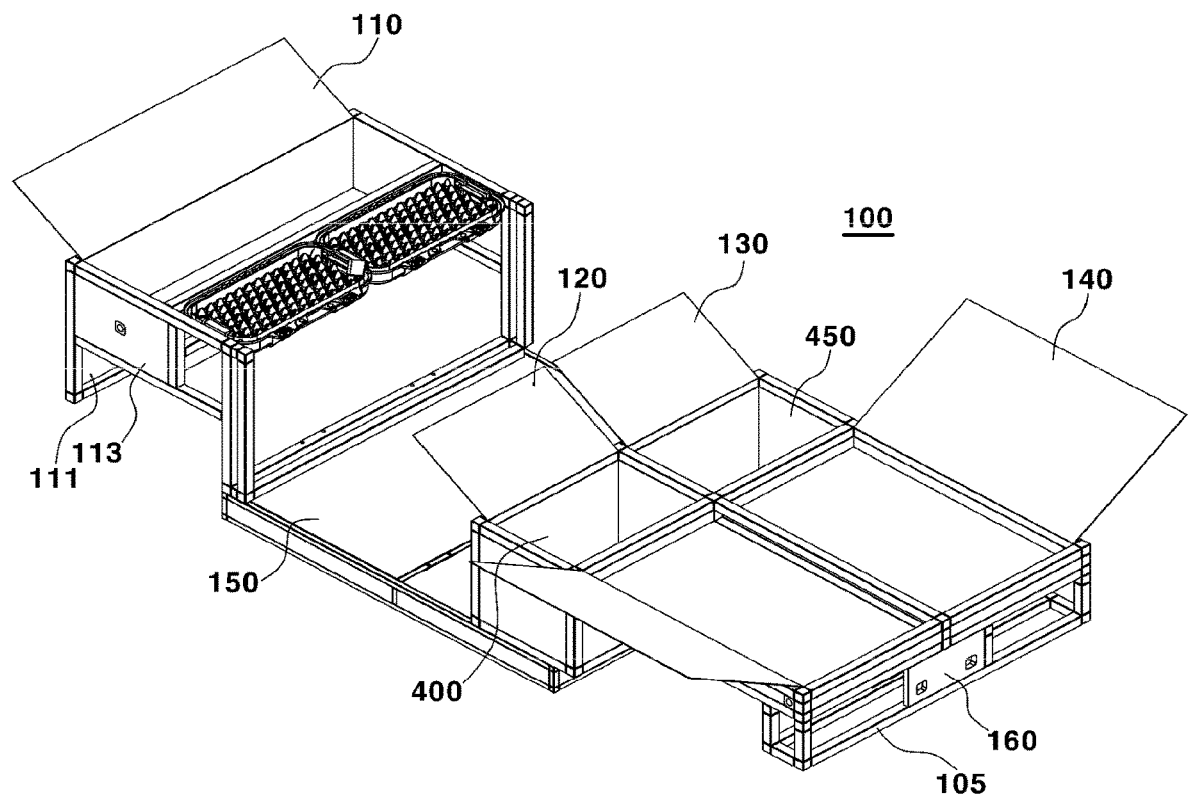

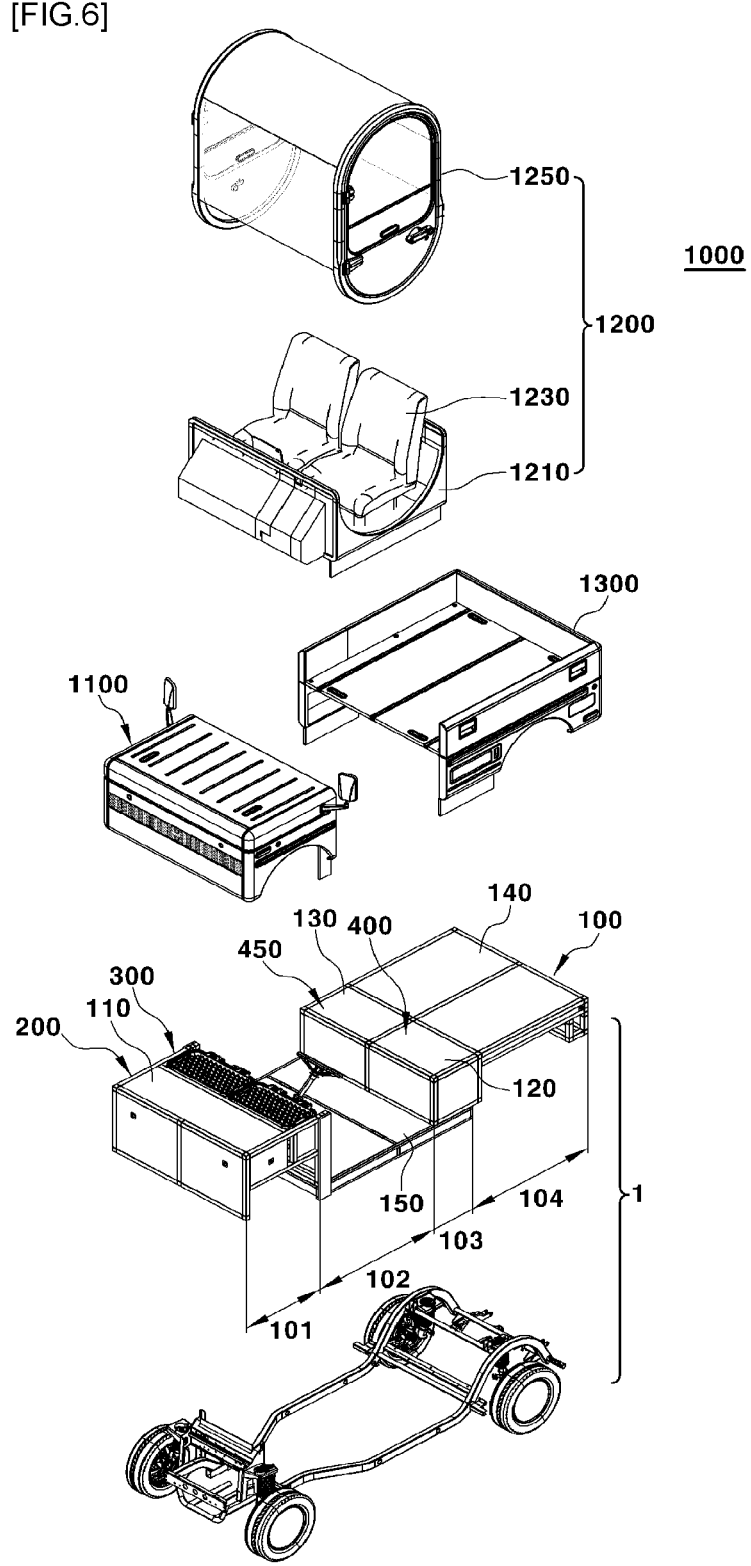
[FIG.6]

[FIG. 7]
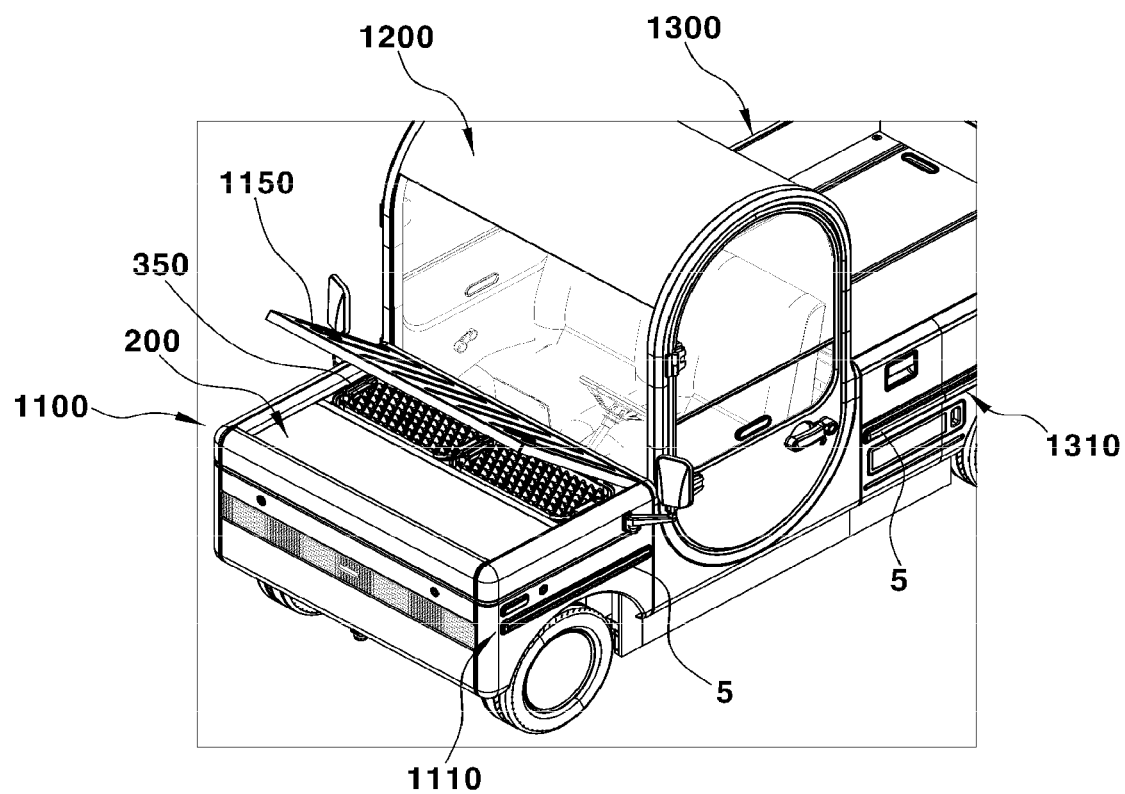

[FIG. 8]
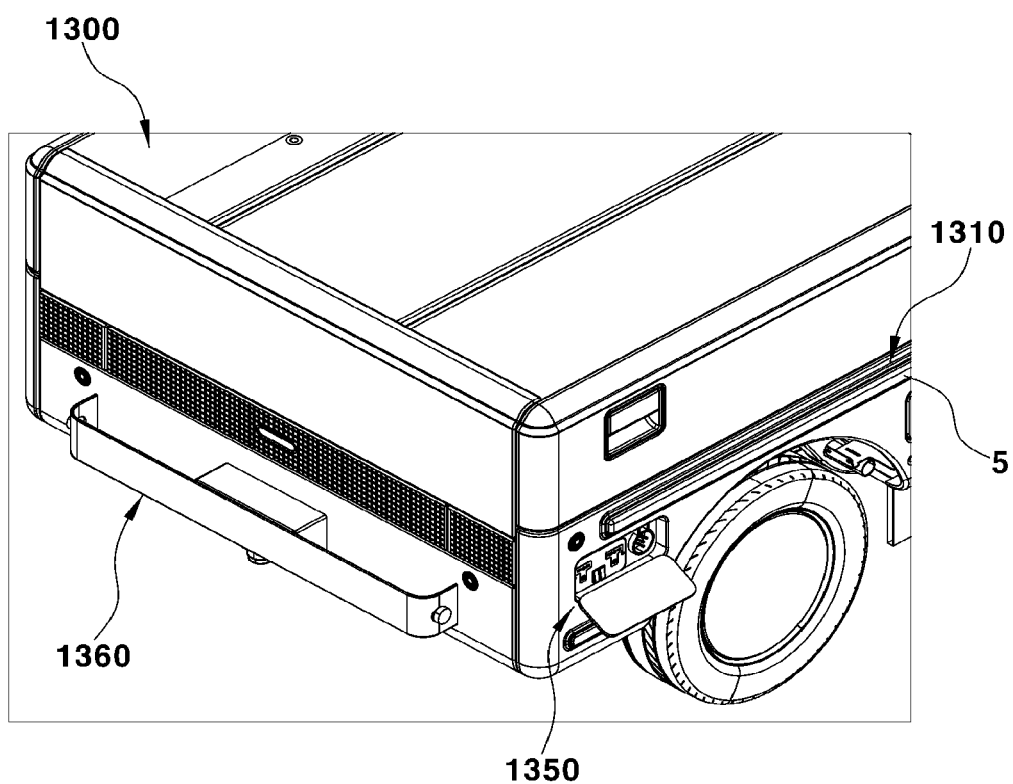

[FIG. 9]
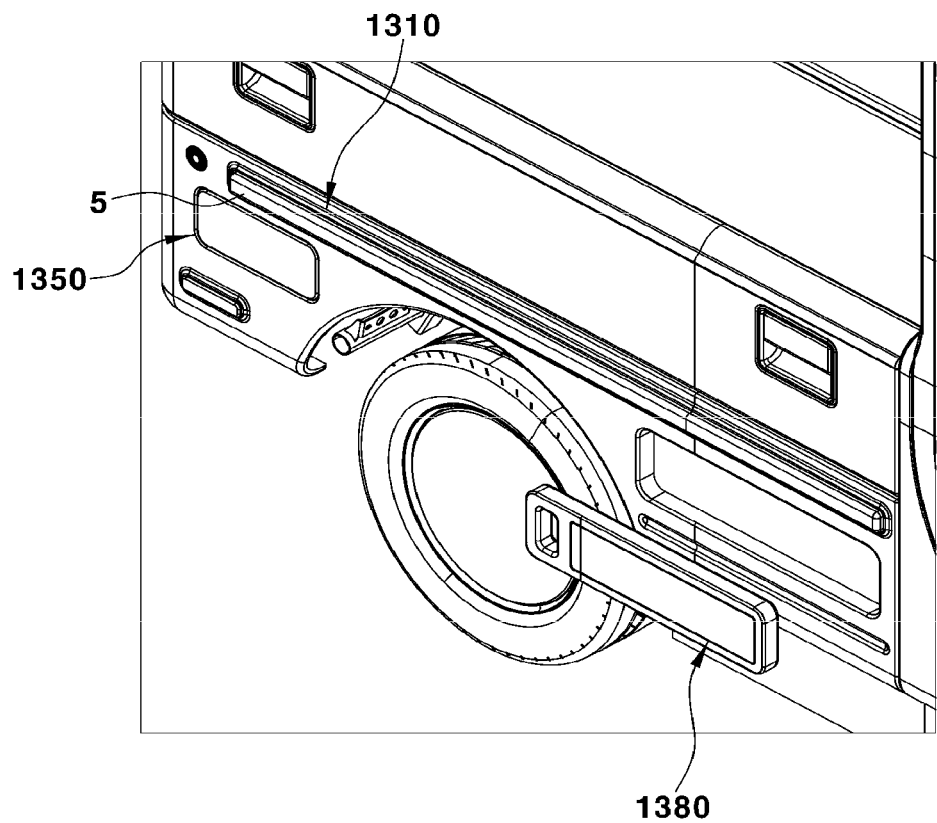

[FIG. 10]
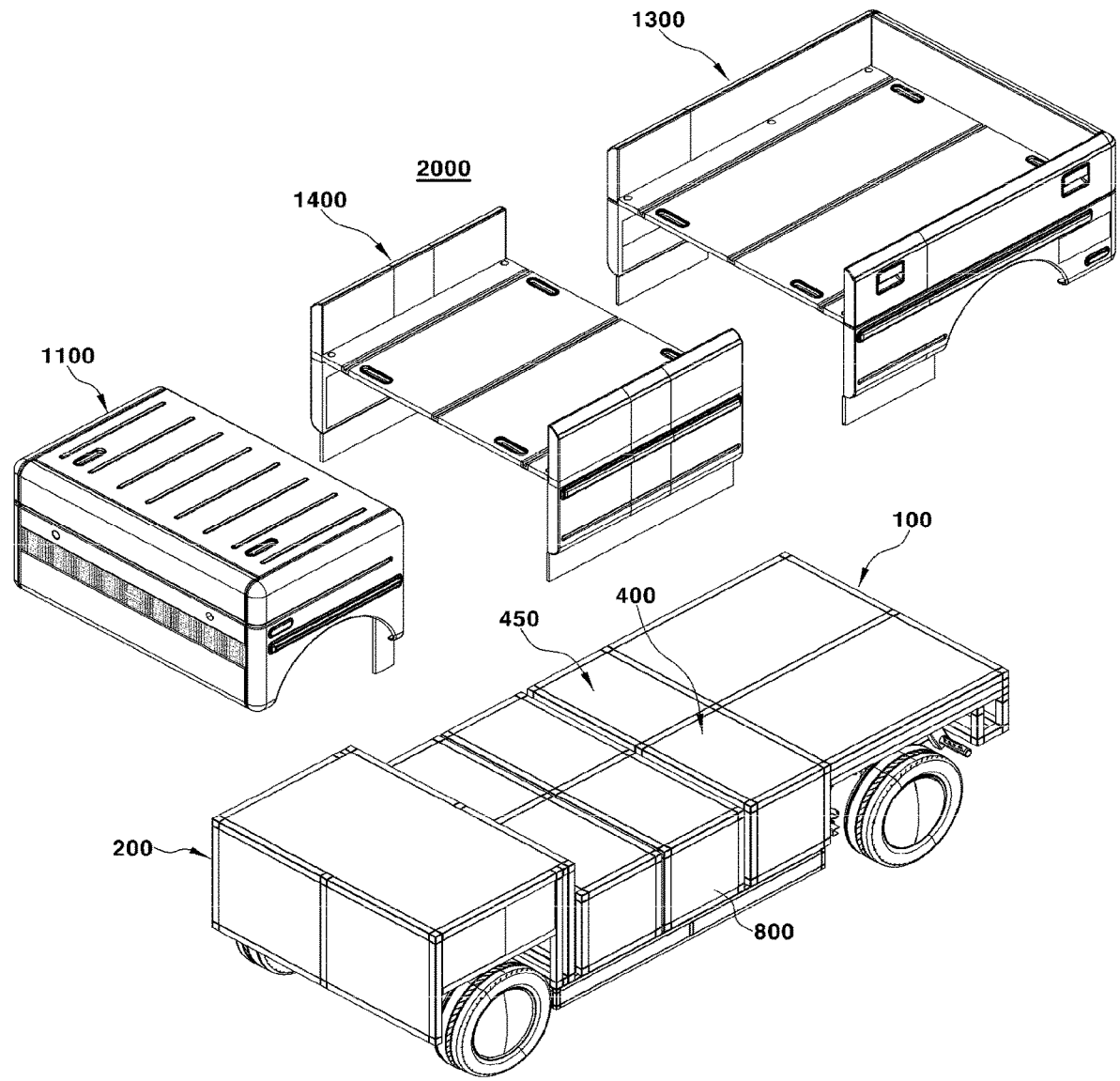

[FIG. 11]
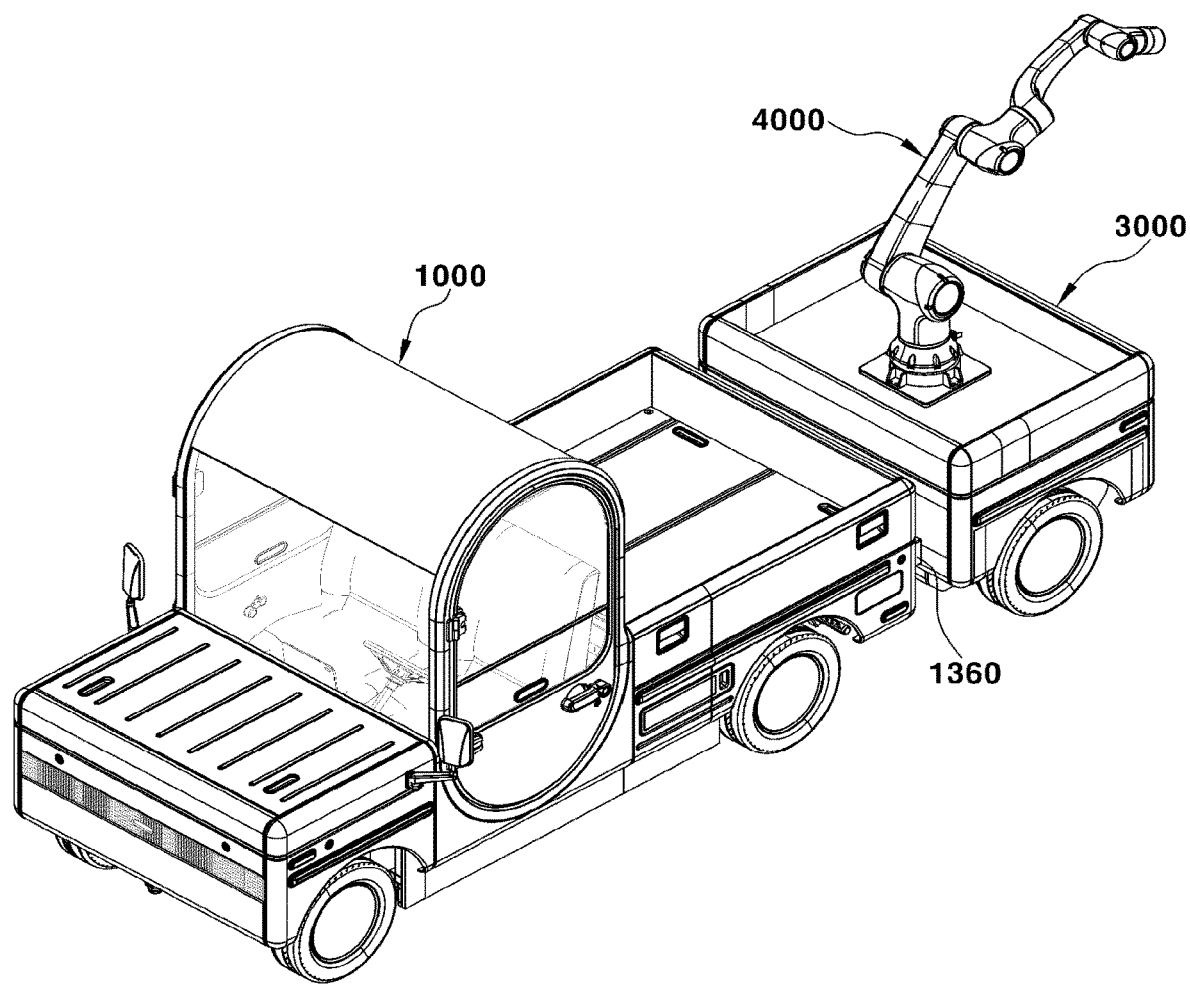

ELECTRIC VEHICLE PLATFORM AND MODULAR VEHICLE STRUCTURE INCLUDING ELECTRIC VEHICLE PLATFORM

CROSS-REFERENCE TO RELATED APPLICATION

This application claims under 35 U.S.C. § 119(a) the benefit of priority from Korean Patent Application No. 10-2021-0124563, filed on Sep. 17, 2021, the entire contents of which are incorporated herein by reference.

BACKGROUND

(a) Technical Field

The present disclosure relates to an electric vehicle platform and to a modular vehicle structure including the electric vehicle platform in which various modules may be combined.

(b) Background Art

Generally, electric vehicles are powered by electricity, and obtain driving energy by rotating motors using electricity accumulated in batteries rather than obtain driving energy from combustion of fossil fuels. Electric vehicles are eco-friendly because they do not use fossil fuels and do not emit carbon dioxide or nitrogen oxides when driven, and when driven only by electric motors, electric vehicles have minimal driving costs, and thus are economical. In addition, it is easier to manufacture electric motors than to manufacture internal combustion engines.

In the future, electric vehicles may be used in various places such as large-scale factories, warehouses, small towns, and resorts. The shapes required for such electric vehicles differ depending on the space where the electric vehicles are to be used. For example, for an electric vehicle used in large-scale factories and warehouses, a wide space to load items meets the needs of a user, rather than a space to comfortably accommodate a driver. In addition, when an electric vehicle is used at a resort, securing space for passengers satisfies users' needs.

Currently, electric vehicles having standardized appearances are sold to consumers, and users cannot change the appearance of electric vehicles to suit their needs. Automobile companies manufacture their own electric vehicle platforms, but the appearance of vehicles implemented on the electric vehicle platforms are determined by the companies. Accordingly, users cannot determine the structures of vehicles as desired.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide an electric vehicle platform and a modular vehicle structure including the electric vehicle platform in which a user may easily combine desired modules.

In one aspect, the present invention provides an electric vehicle platform according to an embodiment of the present invention. The electric vehicle platform may include two side frames extending from front wheels to rear wheels of a vehicle, a plurality of support frames connecting the side frames, a driving motor disposed between two wheels constituting the front wheels or between two wheels constituting the rear wheels, a battery configured to supply power to the driving motor, a controller configured to control the driving motor and the battery, and a cover assembly connected to the side frames and the support frames so as to cover the driving motor, the battery, and the controller. Here, the cover assembly may be divided into a first area, defined above the front wheels, a second area, defined between the front wheels and the rear wheels, a third area, covering the battery and the controller, and a fourth area, defined above the rear wheels.

In a preferred embodiment, a first autonomous driving module including sensors configured to allow autonomous driving of the vehicle may be provided in the first area.

In another preferred embodiment, the cover assembly may include a cover frame, connected to at least one of the side frames and the support frames, and a plurality of covers connected to the cover frame.

In still another preferred embodiment, the covers may include a first cover hinged to the cover frame so as to cover and expose the first autonomous driving module, a second cover hinged to the cover frame so as to cover and expose the controller and the battery, and a third cover hinged to the cover frame so as to expose a space between the two wheels constituting the rear wheels.

In yet another preferred embodiment, a power supply connected to the battery may be provided in the fourth area, and the power supply may be disposed in a space between the third cover and the rear wheels.

In still yet another preferred embodiment, the second area may have a height lower than heights of each of the first area, the third area, and the fourth area, and a boarding module providing a space to accommodate a driver may be inserted in the second area, the second area being recessed relative to the upper surfaces of the first area and the third area.

In a further preferred embodiment, a driving module configured to enable a driver to control the vehicle may be provided in the first area, and a space between the front wheels may be exposed through one side of the driving module, the one side facing the third area from the second area.

In another further preferred embodiment, a second autonomous driving module including sensors configured to allow autonomous driving of the vehicle may be provided in the fourth area, and the second autonomous driving module may be provided in a space under a cover disposed on an upper surface of the fourth area.

In still another further preferred embodiment, a boarding module providing a space to accommodate a driver may be disposed on the second area, and a variable module providing a space to load items in the vehicle may be disposed on the third area and the fourth area.

In yet another further preferred embodiment, a first connecting member may be disposed on the side frame, and a second connecting member may be disposed on the cover frame constituting the cover assembly, the first connecting member may include a first body, extending in a direction perpendicular to a direction in which the side frame extends, and a first extension, surrounding the side frame, and the second connecting member may include a second body, extending in a direction perpendicular to the direction in which the side frame extends, and a second extension, surrounding the cover frame.

In still yet another further preferred embodiment, the first body and the second body may be brought into contact with each other, and the first connecting member and the second connecting member may be fixed to each other through a bolt inserted into first holes defined in the first body and second holes defined in the second body.

In a still further preferred embodiment, the first extension may extend from one surface of the first body, the one surface being opposite a remaining surface of the first body, the remaining surface in contact with the second body, and the first extension may be at least one plate extending from the one surface of the first body, and the second extension may extend from one surface of the second body, the one surface being opposite a remaining surface of the second body, the remaining surface in contact with the first body, and the second extension may be at least one plate extending from the one surface of the second body.

In another aspect, the present invention provides a modular vehicle structure including an electric vehicle platform according to an embodiment of the present invention. The modular vehicle structure may include the electric vehicle platform including two side frames extending from front wheels to rear wheels of a vehicle, a plurality of support frames connecting the side frames, a driving motor disposed between two wheels constituting the front wheels or between two wheels constituting the rear wheels, a battery configured to supply power to the driving motor, a controller configured to control the driving motor and the battery, and a cover assembly connected to the side frames and the support frames so as to cover the driving motor, the battery, and the controller, a driving module disposed in a first area of the cover assembly, a boarding module disposed on a second area of the cover assembly, and a variable module disposed on a third area and a fourth area of the cover assembly. Here, the first area may be defined above the front wheels, the fourth area may be defined above the rear wheels, the second area and the third area may be defined between the front wheels and the rear wheels, and the third area may surround the battery and the controller.

In a preferred embodiment, a power supply connected to the battery so as to supply power of the battery may be provided in the fourth area of the electric vehicle platform, and a power supply terminal connected to the power supply so as to supply power to the outside of the vehicle may be provided in the variable module.

In another preferred embodiment, a first autonomous driving module including sensors configured to allow autonomous driving of the vehicle may be provided in the first area, a second autonomous driving module including sensors configured to allow autonomous driving of the vehicle may be provided in the fourth area, first sensor holes for sensors of the first autonomous driving module may be defined in a driving module cover, the driving module cover being disposed on the first autonomous driving module and the driving module, and second sensor holes for sensors of the second autonomous driving module may be defined in the variable module.

In still another preferred embodiment, the driving module may include a steering wheel and a pedal manipulation part configured to allow a driver to directly control the vehicle, the boarding module may provide a space to accommodate a driver in the vehicle, and the variable module may provide a space to load items in the vehicle.

In yet another preferred embodiment, a connection structure configured to connect a trailer to the vehicle may be provided at a rear side of the variable module.

In still yet another preferred embodiment, the boarding module and the variable module may be detachably coupled to the electric vehicle platform.

In a further preferred embodiment, the modular vehicle structure may further include a driving module cover disposed on the driving module. Here, a first bolting region, configured to connect a variable module cover to the cover assembly through bolting, may be defined in the driving module cover, a second bolting region, configured to connect the variable module to the cover assembly through bolting, may be defined in the variable module, and each of the first bolting region and the second bolting region may be provided with a molding configured to cover a corresponding one of the first bolting region and the second bolting region.

In another further preferred embodiment, an additional battery module including an additional battery may be provided in the second area, the variable module may be disposed on the additional battery module, and an upper surface of the additional battery module may be the same height as upper surfaces of the third area and the fourth area.

Other aspects and preferred embodiments of the invention are discussed infra.

It is to be understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a perspective view illustrating an electric vehicle platform according to an embodiment of the present invention;

FIG. 2 is a view in which an electric vehicle platform according to an embodiment of the present invention is separated into a frame structure and a cover assembly;

FIG. 3 is a view of a structure configured to couple a frame structure with a cover assembly according to an embodiment of the present invention;

FIG. 4 is a view illustrating a connecting member configured to couple a frame structure with a cover assembly according to an embodiment of the present invention;

FIG. 5 is a view illustrating a structure in which covers of a cover assembly according to an embodiment of the present invention are connected to a cover frame;

FIG. 6 is an exploded perspective view illustrating a modular vehicle structure including an electric vehicle platform according to an embodiment of the present invention;

FIG. 7 is a view illustrating a front portion of a modular vehicle structure including an electric vehicle platform according to an embodiment of the present invention;

FIG. 8 is a view illustrating a rear portion of a modular vehicle structure including an electric vehicle platform according to an embodiment of the present invention;

FIG. 9 is a view illustrating a work light attached to a variable module according to an embodiment of the present invention;

FIG. 10 is a view illustrating a modified example of an electric vehicle platform according to an embodiment of the present invention; and FIG. 11 is a view illustrating a modular vehicle structure including an electric vehicle platform according to an embodiment of the present invention, with a trailer attached thereto.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. However, the present invention may be embodied in many different forms, and should not be construed as being limited to the embodiments set forth herein. Rather, the embodiments are provided so that the present invention will be thorough and complete, and will fully convey the scope of the present invention to those skilled in the art. The present invention is defined only by the categories of the claims. Wherever possible, the same reference numbers will be used throughout the drawings to refer to the same or like parts.

It will be understood that, although the terms "first", "second", etc. may be used herein to describe various similar elements, these elements should not be construed to be limited by these terms. These terms are only used to distinguish one element from another.

The detailed description is merely illustrative of the present invention. In addition, the above description shows and describes preferred embodiments of the present invention, but the present invention can be used in various other combinations, modifications, and environments. That is, changes or modifications are possible within the scope of the idea of the invention disclosed herein, the scope equivalent to the described invention, and/or the scope of skill or knowledge in the art. The described embodiments describe the best state for implementing the technical idea of the present invention, and various changes required for specific application fields and uses of the present invention are possible. Therefore, the detailed description of the present invention is not intended to limit the present invention to the disclosed embodiments. Also, the appended claims should be construed to include other embodiments.

FIG. 1 is a perspective view illustrating an electric vehicle platform according to an embodiment of the present invention, and FIG. 2 is a view in which an electric vehicle platform according to an embodiment of the present invention is separated into a frame structure and a cover assembly.

Referring to FIGS. 1 and 2, an electric vehicle platform 1 may include a frame structure, vehicle-driving components coupled to the frame structure, and a cover assembly 100 coupled on the frame structure.

The frame structure may include two side frames 21 and 22 extending from front wheels 10 to rear wheels 15 of a vehicle, and a plurality of support frames 30 connecting the side frames 21 and 22. The distance between the side frames 21 and 22 may be the narrowest between the front wheels 10, and may be the widest between the rear wheels 15. The side frames 21 and 22 may extend to a space between the front wheels 10, and may extend to a level higher than the rear wheels 15. Specifically, the distance between the side frames 21 and 22 may be reduced from the center of the frame structure toward the front wheels 10, and the side frames 21 and 22 may be curved so as to be positioned at a level higher than outer surfaces of the rear wheels 15 (outer surfaces of rear-wheel tires). The support frames 30 may connect the side frames 21 and 22. The support frames 30 may connect the side frames 21 and 22 disposed between the front wheels 10, and may connect the side frames 21 and 22 disposed above the rear wheels 15.

The frame structure may be provided with vehicle-driving components coupled thereto. The vehicle-driving components, which are components configured to operate the vehicle, may include a suspension 40 and a driving motor 50. The suspension 40 is a device configured to absorb impacts from the road so as to prevent the impacts from being transmitted to a vehicle body or a passenger. The suspension 40 may be disposed at each of the front wheels 10 and the rear wheels 15. The driving motor 50 may be disposed between two wheels constituting the front wheels 10 or between two wheels constituting the rear wheels 15. In the embodiment of the present invention, the driving motor 50 may be disposed between the rear wheels 15.

The cover assembly 100 may be disposed on the frame structure. The cover assembly 100 may be connected to the side frames 21 and 22 and to the support frames 30. The cover assembly 100 may cover a first autonomous driving module 200, a second autonomous driving module 250, a driving module 300, a battery 400, and a controller 450 so as to avoid exposing the same to the outside.

The first autonomous driving module 200 and the second autonomous driving module 250 may include sensors for autonomous driving of the vehicle. For example, the sensors may include a lidar sensor, a radar sensor, an ultrasonic sensor, and a camera. The first autonomous driving module 200 may include sensors configured to recognize the situation ahead of the vehicle. The second autonomous driving module 250 may include sensors configured to recognize the situation behind the vehicle. The first autonomous driving module 200 may be disposed at the front of the cover assembly 100, and the second autonomous driving module 250 may be disposed at the rear of the cover assembly 100.

The driving module 300 may include components configured to allow a driver to control the vehicle. The driving module 300 may include a steering wheel and a pedal manipulation part configured to allow a driver to directly control the vehicle.

The battery 400 may supply power to the driving motor 50 and the controller 450. The battery 400 may be disposed inside the cover assembly 100. In addition, the battery 400 may supply power to the first autonomous driving module 200 and to the second autonomous driving module 250.

The controller 450 may control the driving motor 50 and the battery 400. The controller 450 may be disposed inside the cover assembly 100. The battery 400 and the controller 450 may be disposed adjacent to each other, and may be disposed in a direction perpendicular to the direction from the front wheels 10 to the rear wheels 15. The controller 450 may be electrically connected to the first autonomous driving module 200 and the second autonomous driving module 250 so as to control the first autonomous driving module 200 and the second autonomous driving module 250.

The cover assembly 100 may be divided into a first area 101, defined above the front wheels 10, a second area 102, defined between the front wheels 10 and the rear wheels 15, a third area 103 covering the battery 400 and the controller 450, and a fourth area 104, defined above the rear wheels 15. The first autonomous driving module 200 and the driving module 300 may be disposed in the first area 101. The battery 400 and the controller 450 may be disposed in the third area 103. A space between the front wheels 10 may be exposed through one side of the driving module 300, the one side facing the third area 103 from the second area 102. A power supply 126, connected to the battery 400, and the second autonomous driving module 250 may be disposed in the fourth area 104. The power supply 126 may be a configuration configured to supply power provided from the battery 400 to the outside of the vehicle. The power supply 126 and the battery 400 may be electrically connected to each other via a power supply line 125. The power supply line 125 and the power supply 126 may be disposed in a space between a cover frame 105 to be described later, which constitutes the cover assembly 100, and the rear wheels 15.

An upper surface of the first area 101 may have a height higher than those of upper surfaces of the second area 102, the third area 103, and the fourth area 104. However, the upper surface of the first area 101 may be the same height as the upper surfaces of the third area 103 and the fourth area 104. The second area 102 may be lower than the first area 101, the third area 103, and the fourth area 104.

The cover assembly 100 may include the cover frame 105, connected to at least one of the side frames 21 and 22 and the support frames 30, and a plurality of covers 110, 111, 113, 120, 130, 140, and 150, connected to the cover frame 105.

The cover frame 105 is configured to support the cover assembly 100. The cover frame 105 may be a configuration in which frames are connected.

The covers 110, 111, 113, 120, 130, 140, and 150 may be connected to the cover frame 105 so as to define a space in which the first autonomous driving module 200, the driving module 300, the battery 400, and the controller 450 are disposed. The covers 110, 111, 113, 120, 130, 140, and 150 may include a first cover 110, a first-1 cover 111, a first-2 cover 113, a second cover 120 and 130, a third cover 140, and a fourth cover 150.

The first cover 110, the first-1 cover 111, and the first-2 cover 113 may cover the first autonomous driving module 200. The first cover 110 may be hinged to the cover frame 105 so as to expose the first autonomous driving module 200. The first cover 110 may be in contact with a driving module cover (not illustrated) to be described later, and the upper surface of the first area 101 may be one surface of the first cover 110. The first-1 cover 111 may have a surface facing the forward direction of the vehicle. The first-1 cover 111 may have first sensor holes 201 through which some of the sensors constituting the first autonomous driving module 200 are exposed. The first-2 cover 113 may have a surface facing a side surface of the vehicle. The first-2 cover 113 may have second sensor holes 203 through which some of the sensors constituting the first autonomous driving module 200 are exposed.

The second cover 120 and 130 may cover the battery 400 and the controller 450. One surface of the second cover 120 and 130 may be the upper surface of the third area 103. The second cover 120 and 130 may be hinged to the cover frame 105 so as to expose the battery 400 and the controller 450.

The third cover 140 may be hinged to the cover frame 105 so as to expose a space between the two wheels constituting the rear wheels 15. One surface of the third cover 140 may be the upper surface of the fourth area 104.

One surface of the fourth cover 150 may be the upper surface of the second area 102. The fourth cover 150 may serve to support a boarding module (not illustrated) to be described later. For example, the power supply 126 may be disposed under the fourth cover 150.

In addition to the covers described above, a plurality of covers may be additionally coupled to the cover frame 105.

According to an embodiment of the present invention, any configuration capable of driving a vehicle may be adopted in the electric vehicle platform 1. That is, the electric vehicle platform 1 may be configured to operate itself. Accordingly, a user can easily implement an electric vehicle by mounting a configuration for user convenience and a configuration suitable for the purpose of the vehicle on the electric vehicle platform 1.

FIG. 3 is a view of a structure configured to couple a frame structure with a cover assembly according to an embodiment of the present invention, and FIG. 4 is a view illustrating a connecting member configured to couple a frame structure with a cover assembly according to an embodiment of the present invention.

Referring to FIGS. 2 to 4, the frame structure and the cover assembly 100 may be connected to each other to impart rigidity to the vehicle. The cover assembly 100 may be connected to at least one of the side frames 21 and 22 and the support frames 30. For this, connecting members 500 and 600 may be provided. However, the frame structure and the cover assembly 100 may be partially connected to each other by welding or bolting.

The connecting members 500 and 600 may include a first connecting member 500, connected to the side frames 21 and 22, and a second connecting member 600, connected to the cover frame 105 constituting the cover assembly 100. The first connecting member 500 and the second connecting member 600 may have the same structure.

The first connecting member 500 may include a first body 510, extending in a direction perpendicular to the direction in which the side frames 21 and 22 extend, and a first extension 530, surrounding each of the side frames 21 and 22. The second connecting member 600 may include a second body 610, extending in the direction perpendicular to the direction in which the side frames 21 and 22 extend, and a second extension 630, surrounding the cover frame 105.

The first body 510 and the second body 610 may be brought into contact with each other. First holes 515 may be formed in the first body 510, and second holes 615 may be formed the second body 610. Each of the first body 510 and the second body 610 may have a flat plate shape. The first body 510 and the second body 610 may be connected to each other through a bolt 700 inserted into first holes 515 and second holes 615. Since the first body 510 and the second body 610 are connected to each other, the first connecting member 500 and the second connecting member 600 may be connected to each other, thereby allowing the cover frame 105 to be fixed to the side frames 21 and 22.

The first extension 530 may extend from one surface of the first body 510, the one surface being opposite a remaining surface of the first body 510, the remaining surface in contact with the second body 610. The first extension 530 may be at least one plate extending from the one surface of the first body 510. For example, there may be provided two first extensions 530, so that the two first extensions 530 may come into contact with two side surfaces of each of the side frames 21 and 22. For example, the first body 510 and the two first extensions 530 may come into contact with three of four surfaces of each of the side frames 21 and 22.

The second extension 630 may extend from one surface of the second body 610, the one surface being opposite a remaining surface of the second body 610, the remaining surface in contact with the first body 510. The second extension 630 may be at least one plate extending from the one surface of the second body 610. For example, two second extensions 630 may be provided, so that the two second extensions 630 may come into contact with two side surfaces of the cover frame 105. For example, the second body 610 and the two second extensions 630 may come into contact with three of four surfaces of the cover frame 105.

According to the embodiment of the present invention, owing to the first connecting member 500 and the second connecting member 600, each of which is in contact with three of four surfaces of a corresponding one of the side frames 21 and 22 and the cover frame 105, connection between the side frames 21 and 22 and the cover frame 105 may be facilitated, and coupling rigidity between the side frames 21 and 22 and the cover frame 105 may be secured.

FIG. 5 is a view illustrating a structure in which covers of a cover assembly according to an embodiment of the present invention are connected to a cover frame.

Referring to FIGS. 2 and 5, some of the covers constituting the cover assembly 100 may be openably connected to the cover frame 105.

The first cover 110 may be hinged to the cover frame 105 so as to expose the first autonomous driving module 200. The first cover 110 may be hingeable in the forward direction of the vehicle. A user can easily repair the first autonomous driving module 200 by opening the first cover 110.

The second cover 120 and 130 may be hinged to the cover frame 105 so as to expose the battery 400 and the controller 450. The second cover 120 and 130 may be hingeable in the forward or rearward direction of the vehicle. A user can easily repair the battery 400 and the controller 450 by opening the second cover 120 and 130. In addition, a user can replace the battery 400 by opening the second cover 120 and 130.

The third cover 140 may be hinged to the cover frame 105 so as to expose a space between the two wheels constituting the rear wheels 15. The third cover 140 may be hingeable in the rearward direction of the vehicle. A user can easily repair the driving motor 50 by opening the third cover 140.

A fourth cover 150 may be hinged to the cover frame 105 so as to expose the second autonomous driving module 250. A user can easily repair the second autonomous driving module 250 by opening the fourth cover 150.

According to the embodiment of the present invention, since some of the covers are hinged to the cover frame 105, a user can easily repair various vehicle components located under the covers by opening the covers.

FIG. 6 is an exploded perspective view illustrating a modular vehicle structure including an electric vehicle platform according to an embodiment of the present invention.

Referring to FIGS. 2 and 6, a modular vehicle may be implemented by assembling a driving module cover 1100, a boarding module 1200, and a variable module 1300 on the electric vehicle platform 1. The boarding module 1200 and the variable module 1300 may be detachably coupled to the electric vehicle platform 1.

The driving module cover 1100 may be disposed on the first area 101 of the cover assembly 100. The driving module cover 1100 may cover the first autonomous driving module 200 and the driving module 300. The driving module cover 1100 may be physically connected to the cover frame 105 in the first area 101.

The boarding module 1200 may be disposed on the second area 102 of the cover assembly 100. Specifically, the boarding module 1200, providing a space configured to accommodate a driver, may be inserted in the second area 102, the second area 102 being recessed relative to the upper surfaces of the first area 101 and the third area 103. The boarding module 1200 may include a base 1210 directly connected to the cover assembly 100, a seat 1230 mounted on the base 1210, and a cabin 1250 defining a space configured to accommodate a driver. A user may choose the shape of the boarding module 1200.

The variable module 1300, providing a space configured to load items in the vehicle, may be disposed on the third area 103 and the fourth area 104. Here, a user can choose a variable module 1300 suitable for the purpose of the vehicle. For example, the variable module 1300 may be replaced with a module suitable for a freezer compartment or with a module that provides a space to accommodate a passenger.

According to an embodiment of the present invention, a user can choose a desired design and a desired variable module 1300 to manufacture the modular vehicle 1000. For example, a user can order the modular vehicle 1000 without the cabin 1250. Accordingly, the user can purchase the modular vehicle 1000 excluding unnecessary options, which is advantageous in terms of cost. In addition, the user can choose a desired module so as to employ the module in the modular vehicle 1000.

FIG. 7 is a view illustrating a front portion of a modular vehicle structure including an electric vehicle platform according to an embodiment of the present invention.

Referring to FIGS. 6 and 7, the driving module cover 1100 may include a hingeable bonnet 1150. Upon opening the bonnet 1150, the first autonomous driving module 200 and a soundproof material 350 may be exposed. After opening the bonnet 1150, the user can open the cover of the first autonomous driving module 200 to easily repair the sensors constituting the first autonomous driving module 200.

The driving module cover 1100 may be connected to the cover assembly 100 through a first bolting region 1110. The cover frame 105 of the cover assembly 100 may be partially exposed through the first bolting region 1110, and a worker may fix the driving module cover 1100 to the cover frame 105 by performing a bolting operation in the first bolting region 1110. After the bolting operation, a molding 5 that covers the first bolting region 1100 may be provided. The molding 5 may include a rubber molding, a plastic molding, and the like.

On the variable module 1300, a second bolting region 1310, configured to connect the variable module 1200 to the cover assembly 100 through bolting, may be defined. The cover frame 105 of the cover assembly 100 may be partially exposed through the second bolting region 1310, and a worker may fix the variable module 1300 to the cover frame 105 by performing a bolting operation in the second bolting region 1310. After the bolting operation, a molding 5 that covers the second bolting region 1310 may be provided.

FIG. 8 is a view illustrating a rear portion of a modular vehicle structure including an electric vehicle platform according to an embodiment of the present invention.

Referring to FIGS. 2 and 8, the power supply 126, connected to the battery 400 so as to supply power of the battery 400, may be provided in the fourth area 104 of the electric vehicle platform 1. The variable module 1300 may be provided with a power supply terminal 1350 connected to the power supply 126 so as to supply power to the outside of the vehicle. Since the variable module 1300 is connected to the cover frame 105 in the fourth area 104 through the second bolting region 1310 and the power supply 126 is disposed under the cover frame 105 in the fourth area 104, the power supply terminal 1350 may be located at a height lower than the second bolting region 1310.

At a rear side of the variable module 1300, there may be provided a connection structure 1360 configured to connect a trailer (not illustrated) to the vehicle. The connection structure 1360 may be located at a height lower than a taillight of the vehicle.

FIG. 9 is a view illustrating a work light attached to a variable module according to an embodiment of the present invention.

Referring to FIGS. 2 and 9, the variable module 1300 may be provided with a work light 1380 that can be used when a driver performs work after stopping the vehicle. The work light 1380 may receive power from the battery 400 mounted on the vehicle. For example, the work light 1380 may include an LED lamp.

For example, the power supply 126 in the electric vehicle platform 1 may be provided in a plural number, and may provide power to the power supply terminal 1350 and the work light 1380. The work light 1380 may be charged through a separate charging terminal (not illustrated), and the charging terminal (not illustrated) may be electrically connected to the power supply 126.

FIG. 10 is a view illustrating a modified example of an electric vehicle platform according to an embodiment of the present invention.

Referring to FIGS. 2 and 10, an autonomous driving vehicle 2000 may be manufactured only with variable modules 1300 and 1400, configured to load items, without a space configured to accommodate a driver. That is, in the autonomous driving vehicle 2000, a boarding module (the boarding module 1200 in FIG. 6) configured to accommodate a driver may be obviated. Since a space for a driver is not needed, an additional battery module 800 may be disposed in a second area (the second area 102 in FIG. 2) of the electric vehicle platform. The additional battery module 800 may be employed in the existing electric vehicle platform 1. An upper surface of the additional battery module 800 may be the same height as the upper surfaces of the third area 103 and the fourth area 104 of the cover assembly 100.

On the additional battery module 800, there may be disposed a second variable module 1400, which is a space configured to load items. Since the first variable module 1300 and the second variable module 1400 are connected to each other, a user can load more items in the autonomous driving vehicle 2000. Since the first autonomous driving module 200 and the controller 450 configured to control the first autonomous driving module 200 are employed in the autonomous driving vehicle 2000, the autonomous driving vehicle 2000 may move around a work space without a driver.

FIG. 11 is a view illustrating a modular vehicle structure including an electric vehicle platform according to an embodiment of the present invention, with a trailer attached thereto.

Referring to FIG. 11, a trailer 3000 may be connected to the modular vehicle 1000 through the connection structure 1360 provided in the modular vehicle 1000. For example, the trailer 3000 may be a configuration configured to provide additional power to the modular vehicle 1000, and a battery may be mounted inside the trailer 3000.

For example, a logistics robot 4000 for work may be mounted on the trailer 3000. The trailer 3000 may provide power to drive the logistics robot 4000. The modular vehicle 1000 may move to a work area of the logistics robot 4000, and after the modular vehicle 1000 is stopped, the logistics robot 4000 may start working. The modular vehicle 1000 and the logistics robot 4000 according to an embodiment of the present invention may be employed in a smart factory, a large-scale logistics factory, or the like.

As is apparent from the above description, the present invention provides the following effects.

According to an embodiment of the present invention, any configuration capable of driving a vehicle may be adopted in an electric vehicle platform. Accordingly, a user can easily implement an electric vehicle by mounting a configuration for user convenience and a configuration suitable for the purpose of the vehicle on the electric vehicle platform.

According to an embodiment of the present invention, owing to a first connecting member and a second connecting member, each of which is in contact with three of four surfaces of a corresponding one of side frames and a cover frame, connection between the side frames and the cover frame may be facilitated, and coupling rigidity between the side frames and the cover frame may be secured.

According to an embodiment of the present invention, since some of covers are hinged to a cover frame, a user can easily repair various vehicle components located under the covers by opening the covers.

According to an embodiment of the present invention, a user can purchase a modular vehicle excluding unnecessary options, which is advantageous in terms of cost. In addition, the user can choose a desired module so as to employ the module in the modular vehicle.

In the above, embodiments of the present invention have been described with reference to the accompanying drawings. However, those skilled in the art to which the present invention pertains will understand that the present invention may be embodied in other specific forms without changing the technical idea or essential features thereof. Therefore, it should be understood that the embodiments described above are illustrative in all respects and not restrictive.

What is claimed is:

1. An electric vehicle platform comprising:
   two side frames extending from front wheels to rear wheels of a vehicle;
   a plurality of support frames connecting the side frames;
   a driving motor disposed between the front wheels or between the rear wheels;
   a battery configured to supply power to the driving motor;
   a controller configured to control the driving motor and the battery; and
   a cover assembly connected to the side frames and the support frames so as to cover the driving motor, the battery, and the controller,
   wherein the cover assembly is divided into a first area, defined above the front wheels, a second area, defined between the front wheels and the rear wheels, a third area, covering the battery and the controller, and a fourth area, defined above the rear wheels.

2. The electric vehicle platform according to claim 1, wherein a first autonomous driving module comprising sensors configured to allow autonomous driving of the vehicle is provided in the first area.

3. The electric vehicle platform according to claim 2, wherein the cover assembly comprises a cover frame, connected to at least one of the side frames and the support frames, and a plurality of covers, connected to the cover frame.

4. The electric vehicle platform according to claim 3, wherein the covers comprise:
a first cover hinged to the cover frame so as to cover and expose the first autonomous driving module;
a second cover hinged to the cover frame so as to cover and expose the controller and the battery; and
a third cover hinged to the cover frame so as to expose a space between the two wheels constituting the rear wheels.

5. The electric vehicle platform according to claim 4, wherein a power supply connected to the battery is provided in the fourth area, and
wherein the power supply is disposed in a space between the third cover and the rear wheels.

6. The electric vehicle platform according to claim 1, wherein the second area has a height lower than heights of each of the first area, the third area, and the fourth area, and
wherein a boarding module providing a space to accommodate a driver is inserted in the second area, the second area being recessed relative to upper surfaces of the first area and the third area.

7. The electric vehicle platform according to claim 1, wherein:
a driving module configured to enable a driver to control the vehicle is provided in the first area, and
a space between the front wheels is exposed through one side of the driving module, the one side facing the third area from the second area.

8. The electric vehicle platform according to claim 1, wherein a second autonomous driving module comprising sensors configured to allow autonomous driving of the vehicle is provided in the fourth area, and
wherein the second autonomous driving module is provided in a space under a cover disposed on an upper surface of the fourth area.

9. The electric vehicle platform according to claim 1, wherein:
a boarding module providing a space to accommodate a driver is disposed on the second area, and
a variable module providing a space to load items in the vehicle is disposed on the third area and the fourth area.

10. The electric vehicle platform according to claim 1, wherein a first connecting member is disposed on the side frame, and a second connecting member is disposed on the cover frame constituting the cover assembly, and
wherein:
the first connecting member comprises a first body, extending in a direction perpendicular to a direction in which the side frame extends, and a first extension, surrounding the side frame, and
the second connecting member comprises a second body, extending in a direction perpendicular to a direction in which the side frame extends, and a second extension, surrounding the cover frame.

11. The electric vehicle platform according to claim 10, wherein:
the first body and the second body are contacted with each other, and
the first connecting member and the second connecting member are fixed to each other through a bolt inserted into first holes defined in the first body and second holes defined in the second body.

12. The electric vehicle platform according to claim 10, wherein:
the first extension extends from one surface of the first body, the one surface being opposite a remaining surface of the first body, the remaining surface in contact with the second body, and the first extension is at least one plate extending from the one surface of the first body, and
the second extension extends from one surface of the second body, the one surface being opposite a remaining surface of the second body, the remaining surface in contact with the first body, and the second extension is at least one plate extending from the one surface of the second body.

13. A modular vehicle structure comprising an electric vehicle platform, the modular vehicle structure comprising:
the electric vehicle platform comprising two side frames extending from front wheels to rear wheels of a vehicle, a plurality of support frames connecting the side frames, a driving motor disposed between the front wheels or between the rear wheels, a battery configured to supply power to the driving motor, a controller configured to control the driving motor and the battery, and a cover assembly connected to the side frames and the support frames so as to cover the driving motor, the battery, and the controller;
a driving module disposed in a first area of the cover assembly;
a boarding module disposed on a second area of the cover assembly; and
a variable module disposed on a third area and a fourth area of the cover assembly,
wherein:
the first area is defined above the front wheels,
the fourth area is defined above the rear wheels,
the second area and the third area are defined between the front wheels and the rear wheels, and
the third area surrounds the battery and the controller.

14. The modular vehicle structure according to claim 13, wherein:
a power supply, connected to the battery so as to supply power of the battery, is provided in the fourth area of the electric vehicle platform, and
a power supply terminal, connected to the power supply so as to supply power to an outside of the vehicle, is provided in the variable module.

15. The modular vehicle structure according to claim 13, wherein:
a first autonomous driving module comprising sensors configured to allow autonomous driving of the vehicle is provided in the first area,
a second autonomous driving module comprising sensors configured to allow autonomous driving of the vehicle is provided in the fourth area,
first sensor holes for sensors of the first autonomous driving module are defined in a driving module cover, the driving module cover being disposed on the first autonomous driving module and the driving module, and second sensor holes for sensors of the second autonomous driving module are defined in the variable module.

16. The modular vehicle structure according to claim 13, wherein:

the driving module comprises a steering wheel and a pedal manipulation part configured to allow a driver to directly control the vehicle, the boarding module provides a space to accommodate a driver in the vehicle, and the variable module provides a space to load items in the vehicle.

17. The modular vehicle structure according to claim 13, wherein a connection structure configured to connect a trailer to the vehicle is provided at a rear side of the variable module.

18. The modular vehicle structure according to claim 13, wherein the boarding module and the variable module are detachably coupled to the electric vehicle platform.

19. The modular vehicle structure according to claim 13, further comprising:

a driving module cover disposed on the driving module, wherein:

a first bolting region configured to connect a variable module cover to the cover assembly through bolting is defined in the driving module cover, a second bolting region configured to connect the variable module to the cover assembly through bolting is defined in the variable module, and wherein each of the first bolting region and the second bolting region is provided with a molding configured to cover a corresponding one of the first bolting region and the second bolting region.

20. The modular vehicle structure according to claim 13, wherein:

an additional battery module comprising an additional battery is provided in the second area, the variable module is disposed on the additional battery module, and an upper surface of the additional battery module is the same height as upper surfaces of the third area and the fourth area.

* * * * *